Dec. 14, 1954   E. J. McCLOSKEY   2,696,997
ADJUSTABLE DIAMETER SHEAVE
Filed April 11, 1952   2 Sheets-Sheet 1
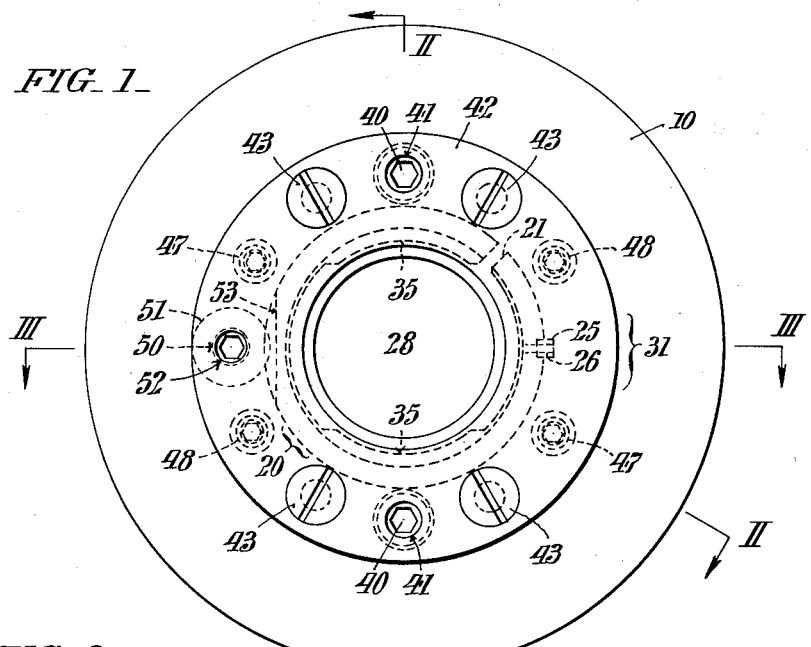
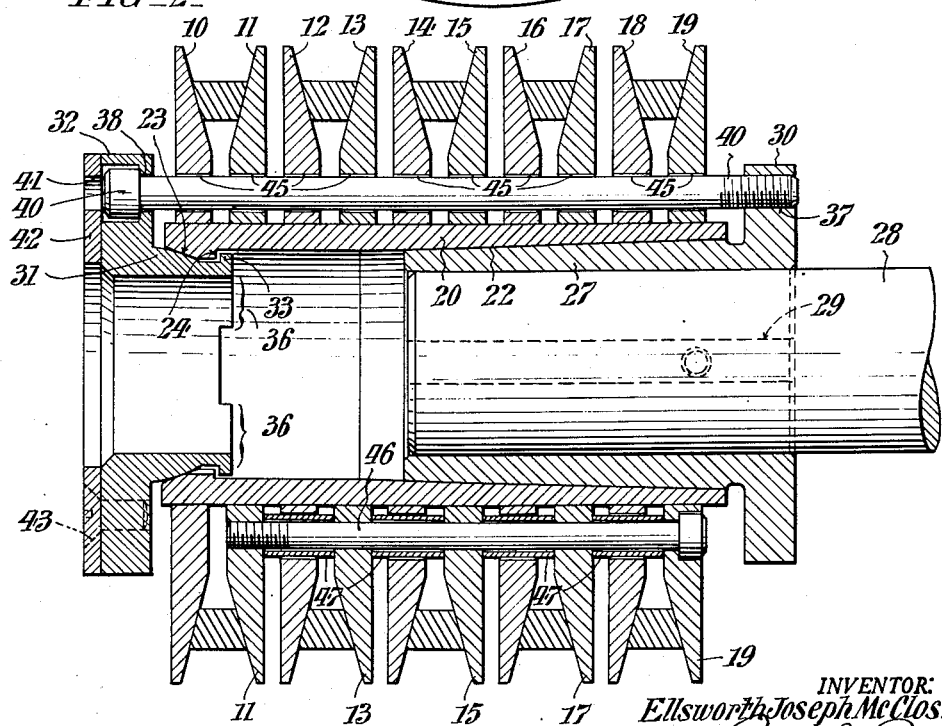
INVENTOR:
Ellsworth Joseph McCloskey,
BY Paul & Paul
ATTORNEYS.

Dec. 14, 1954  E. J. McCLOSKEY  2,696,997
ADJUSTABLE DIAMETER SHEAVE
Filed April 11, 1952  2 Sheets-Sheet 2
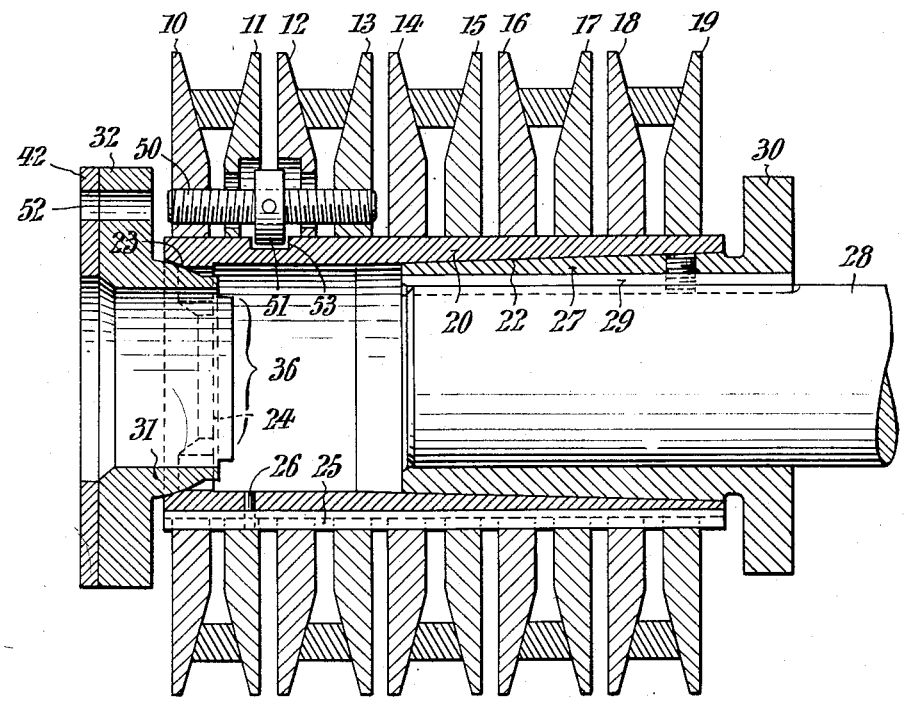
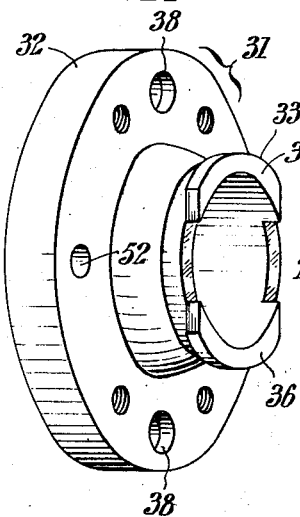
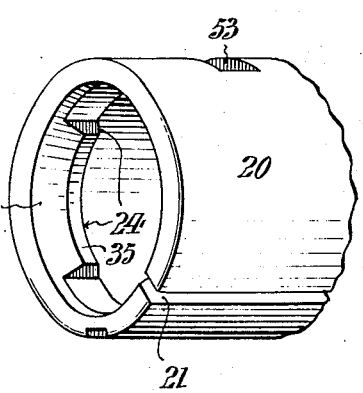
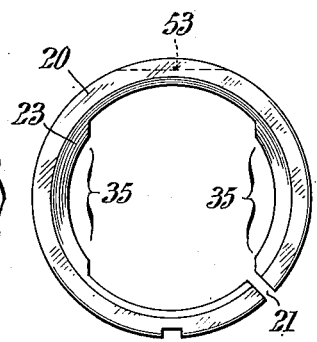
INVENTOR:
Ellsworth Joseph McCloskey,
BY Paul & Paul
ATTORNEYS.

United States Patent Office 2,696,997
Patented Dec. 14, 1954

2,696,997

ADJUSTABLE DIAMETER SHEAVE

Ellsworth Joseph McCloskey, Philadelphia, Pa., assignor to The American Pulley Company, Philadelphia, Pa., a corporation of Pennsylvania Application April 11, 1952, Serial No. 281,741

1 Claim. (Cl. 287—53)

This invention relates to adjustable diameter sheaves, that is to say, to V belt sheaves having opposingly beveled annular flanges or multiple pairs of them, which are axially adjustable toward or away from each for change of effective diameter or pitch and corresponding variation in speed transmission by the belts. More particularly, the present invention is concerned with sheaves of the type disclosed in a co-pending patent application, Serial No. 78,116, filed by William A. Williams on February 24, 1949 which has matured into Patent No. 2,610,515 under date of September 16, 1952, wherein opposing pairs of sheave flanges are mounted upon a longitudinally split hub sleeve whereof the bore is engaged from opposite ends by tapered wedge elements one of which is adapted to be fixedly secured to a shaft end, for example of a driving motor, and wherein one of said elements is spring urged toward the other to normally hold the sleeve circumferentially expanded within the central openings of the sheave flanges and so prevent accidental displacement of the latter in adjusted positions.

The chief aim of my invention is to simplify the construction of sheaves of the kind above particularly referred to, with a view toward reducing the number of parts required and the cost of fabricating them, and also toward facilitating more ready and quicker assembling of said parts.

Other objects and attendant advantages will appear from the following detailed description of the attached drawings, wherein:

Fig. 1 is a view in end elevation of an adjustable sheave conveniently embodying my invention.

Fig. 2 is an axial sectional view of the sheave taken as indicated by the angled arrows II—II in Fig. 1.

Fig. 3 is an axial sectional view of the sheave taken as indicated by the angled arrows III—III in Fig. 1.

Figs. 4 and 5 are perspective views of two hereinafter identified component parts of the sheave.

Fig. 6 is an end view of the part illustrated in Fig. 5.

With more detailed reference to these illustrations, the numerals 10—19 respectively designate the beveled annular flanges of which opposing pairs provide multiple grooves for as many V section belts, corresponding flanges of the respective pairs being axially shiftable by means later described for the purpose of variable speed transmission. As shown, the flanges 10—19 are mounted upon a hub sleeve 20 which is longitudinally split as at 21 (Figs. 1, 5 and 6), the bore of said sleeve having a relatively long gentle inward taper 22 at one end, and a more abrupt and shorter inward taper 23 at the other end, the latter taper terminating in an internal circumferential shoulder at 24. Set into a lengthwise groove in the outer surface of sleeve 20 is a spline 25 (Fig. 3) which is held in place by a pin 26, and which projects into key notches internally of the axial openings in the flanges 10—19.

Engaging into the long tapered bore end of hub sleeve 20 is a wedge bushing 27 whereof the outer surface is tapered to correspond, and whereof the bore is cylindric to fit snugly over the end of the shaft 28 of a motor, or of a machine to be driven, and whereto it is keyed as at 29. At its protruding end, the wedge bushing 27 is provided with a circumferential flange 30.

Engaging into the short tapered bore end 23 of hub sleeve 20 is a correspondingly tapered wedge element 31 which, at its protruding end, has a large circumferential flange 32 like the flange 30 of bushing 27. At its inner end, the wedge element 31 has a smaller circumferential flange 33 which is adapted to engage behind the internal circumferential shoulder 24 within the hub sleeve 20. From Figs. 4, 5 and 6 it will be noted that the flange 33 of wedge element 31 and the circumferential shoulder 24 of the hub sleeve 20 are cut away at opposite sides leaving only diametrical shoulder and flange segments 35 and 36 respectively, with corresponding diametral voids between them. As a consequence, the sleeve 20 and the wedge element 31 can be assembled bayonet lock fashion and interengaged by relative rotation through an angle of ninety degrees as will be readily understood. Flange 30 of the wedge bushing 27 is provided with annularly-arranged circumferentially spaced tapped holes 37, and flange 32 of the wedge element 31 with correspondingly arranged apertures 38 which latter, when these parts are interengaged as above described, align with the aforesaid holes. After such placement, the parts 20 and 27 are connected by headed screws 40 whereof the shanks are passed through apertures 38 in flange 32 of the wedge element 31, and threadedly engaged into the tapped holes in flange 30 of the wedge bushing 27. As shown, the heads of the screws 40 are restrained within counterbore recesses in the flange 32 of wedge element 31, and have polygonal sockets which are accessible for wrench or adjusting tool application through apertures 41 of slightly smaller diameter in a retaining cover plate 42 secured to the outer face of said flange by screws 43. As shown in Fig. 2, the shanks of screws 40 extend through clearance openings 45 in the sheave flanges 10—19.

From Fig. 2 it will be noted that alternate sheave flanges 11, 13, 15, 17 and 19 are connected together by a screw 46 with interposition of spacing collars 47 between them, and it is to be understood that the remaining sheave flanges 10, 12, 14, 16 and 18 are connected by similar screws 48 which appear only in Fig. 1 and spaced by similar collars, not shown.

The means for adjusting the two groups of sheave flanges along the hub sleeve 20 is in the form of a screw element 50, see Figs. 1 and 3, with right and left hand threads at opposite ends thereof engaged respectively in the sheave flanges 10 and 13, said screw element having secured thereto medially, a circumferential enlargement or collar 51 which is positioned between the sheave flanges 11 and 12. Screw element 50 is provided in its outer end, see Fig. 1, with a polygonal socket which is accessible through an opening 52 in the flange 32 of wedge element 31. Accordingly, with this arrangement, opposing pairs of the sheave flanges are shifted toward each other when the screw element 50 is turned in one direction, and away from each other when said screw element is turned in the opposite direction. As best shown in Figs. 1, 3, 4 and 5, the hub sleeve 20 has a transverse groove 53 in its outer surface into which the collar 51 of adjusting screw element 50 extends partway.

Operation

When the sheave is to be adjusted, the screws 40 are backed off, with the result that the wedge element 31 is moved leftward in Fig. 2 and dislodged from the internal taper 23 at the corresponding end of the hub sleeve 20. Eventually, the flange segment 33 of the element 31 will engage the internal shoulder segments 35 of the hub sleeve 20, and, as reverse rotation of screws 40, continues, said sleeve will be carried along and be thereby shifted leftward relative to the bushing 27. As a consequence, the hub sleeve 20 will contract circumferentially and release the sheave flanges 10—19, which can then be adjusted as desired by turning, in one direction or the other, the screw 50 which, as above pointed out, is accessible for wrench application through the opening 52 in flange 32 of the wedge element 31. After the desired adjustment has been made, the screws 40 are tightened, with incidental drawing of the wedge portion of element 31 into the hub sleeve 20 and concurrent shifting of the latter relative to the wedge bushing 27, whereby the sheave flanges 10—19 are reclamped, as in Fig. 2, against subsequent displacement from the new positions to which they have been adjusted. It is to be noted that the parts are so proportioned that a slight movement of the wedge element 31 relative to the wedge bushing 27 suffices for release and refixing of the sheave flanges.

From the foregoing it will be seen that my improved sheave is easily adjusted, and that it is composed of a minimum number of parts which lend themselve to economical fabrication and to ready and quick assembling.

Having thus described my invention, I claim:

In an adjustable diameter sheave having a longitudinally split hub sleeve adapted to be circumferentially expanded within axial openings of at least one pair of opposingly bevelled shiftable sheave flange disks to hold said disks in adjusted positions, an axially hollow tapered wedge bushing fixedly fitting upon and secured to a shaft end and engaging into one end of the hub sleeve, a tapered wedge element engaging into the other end of the hub sleeve, and draw bolts extending through clearance apertures in the disks and through aligning holes in external flanges respectively on the wedge bushing and the wedge element, circumferentially-spaced shoulder segments internally of the hub sleeve; and correspondingly-spaced flange segments around the inner end of the wedge element in radial relation to the draw bolt holes in the external flange of said wedge element for engaging bayonet-fashion behind the shoulder segments of the hub sleeve.

References Cited in the file of this patent

UNITED STATES PATENTS

| Number | Name | Date |
|---|---|---|
| 480,499 | Houghtlin | Aug. 9, 1892 |
| 2,480,222 | Carlson | Aug. 30, 1949 |
| 2,524,027 | Blackmarr | Oct. 3, 1950 |
| 2,545,327 | Williams | Mar. 13, 1951 |
| 2,610,515 | Williams | Sept. 16, 1952 |
| 2,643,581 | Wehrenfennig | June 30, 1953 |
| 2,648,988 | Knudsen | Aug. 18, 1953 |